United States Patent
Bjelland et al.

(10) Patent No.: US 6,879,820 B2
(45) Date of Patent: Apr. 12, 2005

(54) CHARGING IN COMMUNICATION NETWORKS HAVING SPLIT CONTROL PLANES AND USER PLANES

(75) Inventors: Frode Bjelland, Arendal (NO); Juan-Antonio Ibanez, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 652 days.

(21) Appl. No.: 09/903,365

(22) Filed: Jul. 11, 2001

(65) Prior Publication Data

US 2002/0006780 A1 Jan. 17, 2002

Related U.S. Application Data

(60) Provisional application No. 60/217,689, filed on Jul. 12, 2000.

(51) Int. Cl.$^7$ .............................................. H04M 11/00
(52) U.S. Cl. ........................ 455/406; 455/405; 455/407; 455/408; 379/114.01
(58) Field of Search ................................. 455/465, 466, 455/467, 468, 453, 464; 379/111, 112.06, 114.01–114.09, 114.17, 114.28, 114.29; 370/328, 329, 341, 352–356, 395.21, 395.41

(56) References Cited

U.S. PATENT DOCUMENTS

| | | |
|---|---|---|
| 5,438,615 A | 8/1995 | Moen |
| 5,550,827 A | 8/1996 | Fernström |
| 5,592,537 A | 1/1997 | Moen |

(Continued)

FOREIGN PATENT DOCUMENTS

| | | |
|---|---|---|
| EP | 0 920 177 A2 | 6/1999 |
| EP | 939 516 | 9/1999 |
| JP | 2000059397 | 2/2000 |

| | | |
|---|---|---|
| WO | 9726739 A1 | 7/1997 |

(Continued)

OTHER PUBLICATIONS

U. S. Appl. No. 09/903,366, filed Jul. 11, 2001, Bjelland et al.
U. S. Appl. No. 09/903,364, filed Jul. 11, 2001, Bjelland et al.
Granbohm, Håkan and Joakim Wiklund, "GPRS—General packet radio service", pp.82–88, Ericsson Review No. 2, 1999, Sweden.

(Continued)

Primary Examiner—William Trost
Assistant Examiner—Stephen M. D'Agosta

(57) ABSTRACT

A method of facilitating charging for communication in a telecommunication network, such as a network supporting GPRS, that has a node split into a control-plane entity and a user-plane entity includes the step of sending, from the control-plane entity to the user-plane entity, an event in accordance with a media gateway control protocol. The event orders the user-plane entity to notify the control-plane entity when a predetermined volume of communication has occurred. The method further includes the steps of determining, by the user-plane entity, whether the predetermined volume has occurred, and notifying the control-plane entity when that has occurred. The predetermined volume may be a number of octets, and the user-plane entity may notify the control-plane entity by sending a notify command in accordance with the media gateway control protocol. Also, the volume of communication may be selected such that signaling between the control-plane and user-plane entities is controlled, and the control-plane and user-plane entities may be a node supporting a general packet radio service. The network may be a traditional circuit-switched network that uses packet bearers and the predetermined volume of communication may be a predetermined number of octets or packets. The user-plane entity may be pre-provisioned with the event.

14 Claims, 5 Drawing Sheets

U.S. PATENT DOCUMENTS

| | | | |
|---|---|---|---|
| 5,784,442 | A | 7/1998 | Foti |
| 5,884,179 | A | 3/1999 | Patel |
| 5,953,328 | A | 9/1999 | Kim et al. |
| 6,195,760 | B1 | 2/2001 | Chung et al. |
| 6,411,617 | B1 * | 6/2002 | Kilkki et al. ............... 370/353 |
| 6,466,585 | B1 * | 10/2002 | Le ............................ 370/465 |
| 6,490,451 | B1 * | 12/2002 | Denman et al. ............ 455/436 |
| 6,640,105 | B1 * | 10/2003 | Shin ........................... 455/453 |
| 6,671,367 | B1 * | 12/2003 | Graf et al. ................... 379/229 |
| 2002/0150091 | A1 * | 10/2002 | Lopponen et al. .......... 370/389 |

FOREIGN PATENT DOCUMENTS

| | | | | |
|---|---|---|---|---|
| WO | WO97-26739 | * | 7/1997 | ........... H04L/12/56 |
| WO | 9827691 | A1 | 6/1998 | |
| WO | 98 38590 | A1 | 9/1998 | |
| WO | 9900946 | A2 | 1/1999 | |
| WO | 9929065 | A2 | 6/1999 | |
| WO | 9934635 | A3 | 7/1999 | |
| WO | 9956478 | A1 | 11/1999 | |
| WO | 9963774 | A1 | 12/1999 | |
| WO | 200001173 | A1 | 1/2000 | |
| WO | 200010357 | A1 | 2/2000 | |
| WO | 200016579 | | 3/2000 | |
| WO | 200016579 | A1 | 3/2000 | |

OTHER PUBLICATIONS

Ekeroth, Lars and Per–Martin Hedström, "GPRS support nodes", pp. 156–169, Ericsson Review No. 3, 2000, Sweden.

"3rd Generation Partnership Project (3GPP); Technical Specification Group Services and System Aspects; Feasibility Study for Transport and Control Separation in the PS CN Domain" TR23.873v1.1.0, 3GGP TSG SA2 Meeting #15, pp. 1–99, Jan. 22nd–26th 2001, Los Angeles, California.

"3rd Generation Partnership Project; Technical Specification Group Services and System Aspects; GSM call and event data for the packet switched domain" 3G TS 32.015 version 3.0.0, pp. 1–58, 1999, France.

"Draft Recommendation H.248 with changes against white paper", ITU—Telecommunication Standardization Sector TD–XX, Study Group 16, pp. 1–136, Jun. 15, 2000, Geneva, Switzerland.

"3rd Generation Partnership Project; Technical Specification Group Services and System Aspects; General Packet Radio Service (GPRS); Service description; Stage 2",3G TS 23.060 V3.3.0 (2000–04) pp. 1–190, 2000, France.

"SGSN Decompositions", Tdoc S2–000888, 3GPP TSGSA2 Meeting #131, Berlin, May 22–26,2000.

* cited by examiner

CHARGING IN COMMUNICATION NETWORKS HAVING SPLIT CONTROL PLANES AND USER PLANES

This application claims priority to U.S. Provisional Patent Application No. 60/217,689 that was filed on Jul. 12, 2000, and that is incorporated here by reference.

BACKGROUND

This invention relates to methods and apparatus for telecommunication and in particular to charging in a packet-switched communication system having a split controlplane/user-plane architecture and to use of Media Gateway Control protocol mechanisms to handle parameters needed in call detail records in such a communication system.

In a packet data communication system, information is exchanged as packets of digital data, or datagrams. Each data packet includes address information that enables the system to direct each packet on its own way through the system from a sender to a receiver. Thus, a packet data communication system does not maintain a continuous connection between a sender and a receiver. Packet data communication systems are sometimes called "connection-less" and packet-switched systems, distinguishing them from traditional telephony systems in which continuous connections are established between senders and receivers. Thus, traditional telephony systems are sometimes called "connection-oriented" and circuit-switched systems.

General packet radio service (GPRS) is a packet-switched communication system that is standardized by the European Telecommunications Standards Institute (ETSI) and the Third Generation Partnership Project (3GPP). See for example "Digital Cellular Telecommunications System (Phase 2+) (GSM); General Packet Radio Service (GPRS); Service description; Stage 2", 3GPP TS 03.60 ver. 7.6.0 Release 1998; and "General Packet Radio Service (GPRS); Service Description; Stage 2", 3GPP TS 23.060 ver. 3.3.0 Release 1999 (April 2000). GPRS is also described in H. Granbohm et al., "GPRS—General Packet Radio Service", *Ericsson Review* No. 2, pp. 82–88 (1999) and in L. Ekeroth et al., "GPRS Support Nodes", *Ericsson Review* No. 3, pp. 156–169 (2000).

GPRS operates with circuit-switched, cellular mobile telephone systems such as the Global System for Mobile (GSM) system, also standardized by ETSI and 3GPP, and the U.S. time division multiple access (TDMA) cellular system defined by the TIA/EIA-136 standard promulgated by the Telecommunications Industry Association (TIA) and Electronic Industries Association (EIA). By adding GPRS functionality to GSM and TDMA public land mobile networks (PLMNs), network operators can give their subscribers resource-efficient access to external Internet protocol-based (IP-based) networks like the Internet.

As depicted in FIG. 1, a GSM-style PLMN includes a number of interconnected network nodes, in particular, a mobile switching center/visitor location register (MSCNLR), a home location register (HLR), and base station subsystems (BSS). The BSS handles radio communication with subscribers' mobile stations (MSs) via an air interface Um. The HLR is a database of information about the subscribers that is accessed by the MSC/VLR via a D-interface and that is accessed by a serving GPRS support node (SGSN) via a Gr-interface. The MSC/VLR routes circuit-switched calls to and from the MSs, communicating with the BSS over an A-interface. It will be appreciated that these nodes are typical of a circuit-switched network such as a PLMN, whether GSM or not. Data transfer and signaling interfaces are indicated in FIG. 1 by solid lines and signaling interfaces are indicated by dashed lines.

Packet data services and GPRS add nodes in a packet-switched portion of the communication network for handling packet data traffic; these nodes interwork with the circuit-switched portion of the communication system depicted in FIG. 1. For example, an SGSN is connected to the BSS via a Gb-interface and resides at the same hierarchical level in the network as the MSC/VLR. A gateway GPRS support node (GGSN) is the interconnection point to a packet data network (PDN) via a Gi-interface and is connected to the SGSN via a Gn-interface (which may be an IP backbone). User data to the Internet, directed for example, from a terminal equipment (TE) connected to a mobile terminal (MT), is sent encapsulated over the IP backbone. In FIG. 1, R is a reference point between a non-ISDN compatible TE and an MT. In this application, the end-user's equipment is called a mobile station (MS) whether it is a combination of a phone (MT) and a device such as a computer (TE) or just a phone.

The SGSN and GGSN can be combined into one physical node and deployed at a central point in the network, or a network may include several GGSNs and SGSNs as shown. Packet data streams and short text messages are handled in FIG. 1 by a Short Message Service—Gateway MSC (SMS-GMSC) and an SMS—Interworking MSC (SMS-IWMSC) that communicate with the HLR via a C-interface and with the MSC/VLR via an E-interface. As seen in FIG. 1, the SMS-GMSC and SMS-IWMSC exchange short messages with a short message switching center (SM-SC), and the SMS-GMSC communicates with the SGSN via a Gd-interface. It will be appreciated that the nodes depicted in FIG. 1 are typical of a packet-switched network, whether a GPRS network or not.

Most of the interfaces depicted in FIG. 1, and in particular the Gs- and A-interfaces, exchange messages with the help of the Signaling System Number 7(SS7) that is standardized by ETSI and the American National Standards Institute (ANSI), among others. SS7 in GSM and GPRS uses a message transfer part (MTP) protocol to deliver messages and a signaling connection control part (SCCP) protocol for extended addressing. The SCCP protocol provides for each message to have an SCCP header that has a sub-system number for telling the node receiving the message which application should have the message. An SGSN, for example, typically has different sub-system numbers for communication with the HLR and with the MSC/VLR. An MSC usually derives the node type of a communicating peer node based on the sub-system number that may be stored in a database or included in an earlier message.

In a GPRS network, packet data channels (PDCHs) are mapped onto respective timeslots, thereby utilizing the same physical channel structure as ordinary circuit-switched GSM/TDMA channels. All radio resources are managed from a base station controller (BSC) in the BSS, which also includes Base Transceiver Stations (BTS); the pool of physical channels for a given cell can be used as either circuit-switched channels or packet-data channels. By packet multiplexing, the allocated PDCHs can be shared by every GPRS user in the cell, and the number of PDCHs in a cell can be fixed or dynamically allocated to meet fluctuating traffic demands. To support efficient multiplexing of packet traffic to and from mobile stations, or mobile terminals (MTs), packet data traffic channels (PDTCHs), packet associated control channels (PACCHs), and packet data common control channels (PDCCHs) are specified for the air interface Um, although PDCCHs are not always used.

As noted above, an SGSN serves every GPRS subscriber that is physically located within the SGSN's service area. To a large extent, the SGSN does for the packet data service what the MSC/VLR does for circuit-switched service. The mobility management functions for GPRS terminals that are performed by an SGSN include attach/detach, user authentication, ciphering, location management, and so on, and an SGSN supports combined mobility management for at least some mobile terminals by interworking with the MSC/VLR. An SGSN also manages the logical link to mobile terminals that carries user packet traffic, SMS traffic, and layer-3 signaling between the network and the GPRS terminals. An SGSN also routes and transfers packets between mobile terminals and the GGSN; handles packet data protocol (PDP) contexts (the PDP context defines important parameters, such as the access point name, quality of service, the GGSN to be used, and so on, for connection to the external packet data network); interworks with the radio resource management in the BSS; and generates charging data.

As noted above, the GGSN accommodates the interface to external IP-based networks. Access-server functionality in the GGSN is defined according to standards from the Internet Engineering Task Force (IETF). The GGSN functions as a border gateway between the PLMN and external networks, sets up communication with external packet data networks, authenticates users to external packet networks, routes and tunnels packets to and from the SGSN, and generates charging data.

The MSC/VLR also supports integrated mobility management for mobile terminals. GPRS attach and PDP-context activation must be executed in order for GPRS users to connect to external packet data networks. The mobile terminal makes itself known to the network by means of GPRS attach, which corresponds to IMSI attach used for circuit-switched traffic. Once the terminal is attached to the network, the network knows its location and capabilities. For some mobile terminals, circuit-switched IMSI attach and packet-switched GPRS attach can be performed at the same time.

GPRS attach is depicted by FIG. 2. In step 1, the mobile terminal requests that it be attached to the network. The terminal's request, which is sent to the SGSN, includes parameters that indicate its multi-timeslot capabilities, the ciphering algorithms it supports, whether it wants to attach to a packet-switched service or to both packet- and circuit-switched services, etc. In step 2, authentication is made between the terminal and SGSN, which may fetch relevant data from the HLR. In step 3, subscriber data from the HLR is inserted into the SGSN; and in step 4, information is passed to the terminal that indicates the terminal is attached to the network.

Before the mobile terminal can communicate with an external PDN (e.g., an IP network), a PDP context must be activated. The PDP context includes parameters that describe the characteristics of the connection to the external PDN, e.g., the address allocated to the MS, access point name (APN), QoS, and so on. PDP contexts may be primary or secondary, in which a secondary PDP context uses the same MS IP address and is connected towards the same APN (i.e., external net) as its respective primary PDP context. A composite PDP context contains one primary and zero or more secondary PDP contexts.

PDP-context activation is depicted in FIG. 3. In step 1, the mobile terminal requests PDP-context activation. In step 2, the SGSN validates the request based on subscription information received from the HLR during GPRS attach. In step 3, the APN is sent to a domain name server (DNS) from the SGSN to find the IP address of the relevant GGSN. In step 4, a logical connection is created between the SGSN and the GGSN (i.e., a GPRS Tunneling Protocol (GTP) tunnel is formed). In step 5, the GGSN assigns a dynamic IP address to the mobile terminal, if required, from the range of IP addresses allocated to the PLMN or externally, from a Remote Authentication Dial-In User Service (RADIUS) server (a fixed IP address from the HLR could also be used). A RADIUS client is included in the GGSN to support Password Authentication Protocol (PAP) and Challenge Handshake Authentication Protocol (CHAP) authentication to external networks with RADIUS servers. After an acknowledgment of the PDP context activation is returned to the MS (step 6), communication between the user and the external PDN (e.g., an Internet Service Provider (ISP) network or a corporate network) can commence (step 7).

Many network operators see an advantage in physically splitting node(s) in a network like that depicted in FIG. 1 into control plane node(s) and user plane node(s), thus better enabling independent scalability of signaling traffic and data traffic. In particular, the number of end-users is scalable independently of the end-user traffic. By connecting each user-plane node to several control-plane nodes and vice versa, it is possible to use the total network capacity more efficiently. Moreover, it is possible to dispose common user-plane nodes between the circuit-switched and the packet-switched portions of the communication network to reduce the necessary network resources even further and to provide a better migration path when circuit-switched equipment is replaced packet-switched equipment. Also, this enables cheaper replacement of the network nodes handling user-plane traffic as technology evolves.

The Universal Mobile Telecommunication System (UMTS) is a combined circuit-switched and packet-switched communication system. The circuit-switched portion has a split control-plane/user-plane architecture, and therefore physically splitting nodes in the circuit-switched portion of this system is already possible. The packet-switched portion does not have a split architecture, although a logical split already exists in the current specifications of the packet-switched portion and thus it may be just a matter of time before a split architecture is defined.

When a split architecture is implemented, a protocol for communications between control- and user-plane entities must be defined. Two such protocols are the H.248 and Media Gateway Control (MEGACO) protocols, which are similar enough that they will be called the H.248/MEGACO protocol in this application. The H.248/MEGACO protocol defines, in an open and flexible way, a generic framework for information exchange between control-plane and user-plane entities as well as application-specific packages that can be tailored to the different needs of an application like GPRS. The H.248 protocol is being developed by Study Group 16 of the International Telecommunications Union (ITU) (see Draft Recommendation H.248, ITU (Jun. 15, 2000), which is incorporated here by reference). The MEGACO protocol is being developed in the IETF's MEGACO working group (see N. Greene et al., "Megaco Protocol version 0.8", RFC 2885, IETF (August 2000) and T. Taylor, "Megaco Errata", RFC 2886, IETF (August 2000), which are the successors to N. Greene et al., "Media Gateway Control Protocol Architecture and Requirements", RFC 2805, IETF (April 1999)).

In these standardization protocols, the call/application function located in the control plane is called a Media Controller (MC) and the bearer/resource function located in the user plane is called a Media Gateway (MG). An MG normally converts media provided in one type of network to a format required in another type of network, and an MC controls the parts of a call state that pertain to connection control for media channels in an MG. For example, an MG may terminate bearer channels from a circuit-switched network (e.g., DS0 channels in a PSTN) and media streams from a packet-switched network (real-time transport protocol (RTP) streams in an IP network).

FIG. 4 depicts such a network that has two nodes and a split architecture. The nodes 402, 404 include respective MCs 406, 408 and respective MGs 410, 412. Communications on the interface between the media controllers, i.e., the control-plane entities, are conducted according to a call/application control protocol. Communications on the interface between the media gateways, i.e., the user-plane entities, are conducted according to a bearer/resource protocol. Communications on the interface between the control-plane and user-plane entities can be conducted according to the H.248/MEGACO protocol.

The H.248/MEGACO protocol provides a mechanism called an Event. A Media Controller can send an Event to a Media Gateway to instruct the Media Gateway to detect a condition, parameter, etc. If the Media Gateway detects the identified condition, the Media Gateway informs the Media Controller that the Event has occurred. For example, conditions that might be monitored are the transferred information volume (e.g., the number of sent/received octets/packets) and the time duration of a communication session, which can be used as bases for charging a subscriber for the service provided.

In a split architecture, the Media Gateway has knowledge of the transferred volume and session duration simply by counting the appropriate octets/packets or by determining the lifetime of a PDP context, but it is preferable for the Media Controller to maintain control of the communication session and the charging service. Referring again to FIG. 1, charging is typically carried out by a network provider's billing system that communicates with other nodes, in particular SGSNs and GGSNs, through a charging gateway functionality (CGF) and Ga-interfaces for charging data collection. The CGF may be implemented as a separate network element as depicted in FIG. 1 or as a distributed functionality resident in the SGSNs and GGSNs or even as a combination of these. See for example "GSM Call and Event Data for the Packet Switched Domain", 3GPP TS 32.015 ver. 3.0.0 (January 2000). An SGSN typically collects charging information related to radio network usage for each MS and a GGSN typically collects charging information related to external packet data usage for each MS.

Currently, how charging can be handled in a GPRS system having a split architecture has not been defined, but in view of the effort being expended to develop the H.248/MEGACO protocol, it could be beneficial to use that protocol in a wide variety of communication environments, including GPRS for example. In addition, the data handled in some types of call detail records (CDRs) are solely based on control-plane functionality, like signaling messages transmitted in the control plane and parameters transmitted in these signaling messages. Thus, these CDRs and the data within them are advantageously handled in the control plane. Data handled in other types of CDRs are based on both control-plane functionality (like signaling parameters sent in the control plane) and user-plane traffic (like transferred volume). There are some tens of control plane parameters but only a small number of user plane parameters. Thus, it has been suggested that a user-plane entity should transfer the parameters it knows to the control-plane entity when required and that the rest of the necessary functionality should be handled in the control plane entity.

The handling of the CDR itself is common for all types of CDRs, which are charging data, and hence it may be beneficial to place this functionality in one place, preferably in the control plane, although an external server/node, connected to the control plane entity, can instead handle the CDRs. Nevertheless, how to use the mechanisms of a Media Gateway Control protocol like the H.248/MEGACO protocol to get the user-plane parameters transferred at the right time to the control plane entity in a split architecture has not been defined.

Various aspects of these efforts are described in "Feasibility Study for Transport and Control Separation in the PS CN Domain", 3GPP TR 23.873 ver. 1.1.0 (January 2001), and U.S. patent application Ser. Nos. 09/903,364 and No. 09/903,365, both filed on Jul. 11, 2001, by F. Bjelland et al., all of which are incorporated here by reference.

SUMMARY

In accordance with one aspect of Applicants' invention, there is provided a method of facilitating charging for communication in a telecommunication network, such as a network supporting GPRS, that has a node split into a control-plane entity and a user-plane entity. The method includes the step of sending, from the control-plane entity to the user-plane entity, an event in accordance with a media gateway control protocol. The event orders the user-plane entity to notify the control-plane entity when a predetermined volume of communication has occurred. The method further includes the steps of determining, by the user-plane entity, whether the predetermined volume of communication has occurred, and notifying the control-plane entity when the predetermined volume of communication has occurred.

The predetermined volume of communication may be a predetermined number of octets, and the user-plane entity may notify the control-plane entity by sending a notify command in accordance with the media gateway control protocol. Also, the volume of communication may be selected such that signaling between the control-plane and user-plane entities is controlled, and the control-plane and user-plane entities may be a GSN, e.g., an SGSN and a GGSN. The network may be an updated circuit-switched network using packet bearers and the predetermined volume of communication may be a predetermined number of octets or packets.

In another aspect of Applicants' invention, a method in a telecommunication network, such as a network supporting GPRS, having a control-plane entity and a user-plane entity of facilitating charging for communication includes the steps of pre-provisioning the user-plane entity with an event in accordance with a media gateway control protocol. The event orders the user-plane entity to notify the control-plane entity when a predetermined volume of communication has occurred. The method further includes determining, by the user-plane entity, whether the predetermined volume of communication has occurred, and notifying the control-plane entity when the predetermined volume of communication has occurred.

BRIEF DESCRIPTION OF THE DRAWINGS

The features, objects, and advantages of this invention will be apparent from reading this description in conjunction with the drawings, in which.

DETAILED DESCRIPTION

This description is given in terms of GPRS for convenience only, and it will be appreciated that the principles of the invention can be applied in other packet-switched networks having suitable characteristics. It will also be appreciated that this invention can be implemented in an MSC or equivalent node in a circuit-switched part of a network that has been updated to use packet bearers such as IP packets.

Figure 5:
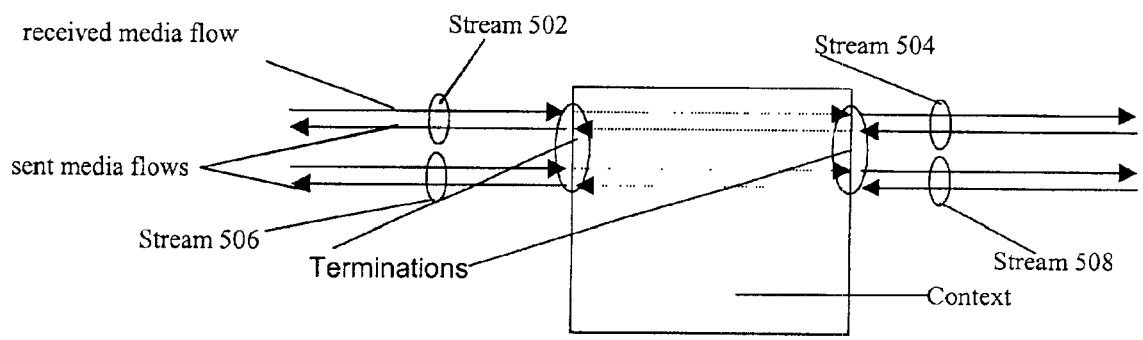
FIG. 5 depicts a conceptual organization of media gateway control protocol concepts.

The H.248/MEGACO protocol is organized according to user-plane concepts of Contexts, Terminations, Streams, and Descriptors, which can be better understood with the help of FIG. 5.

Figure 1:
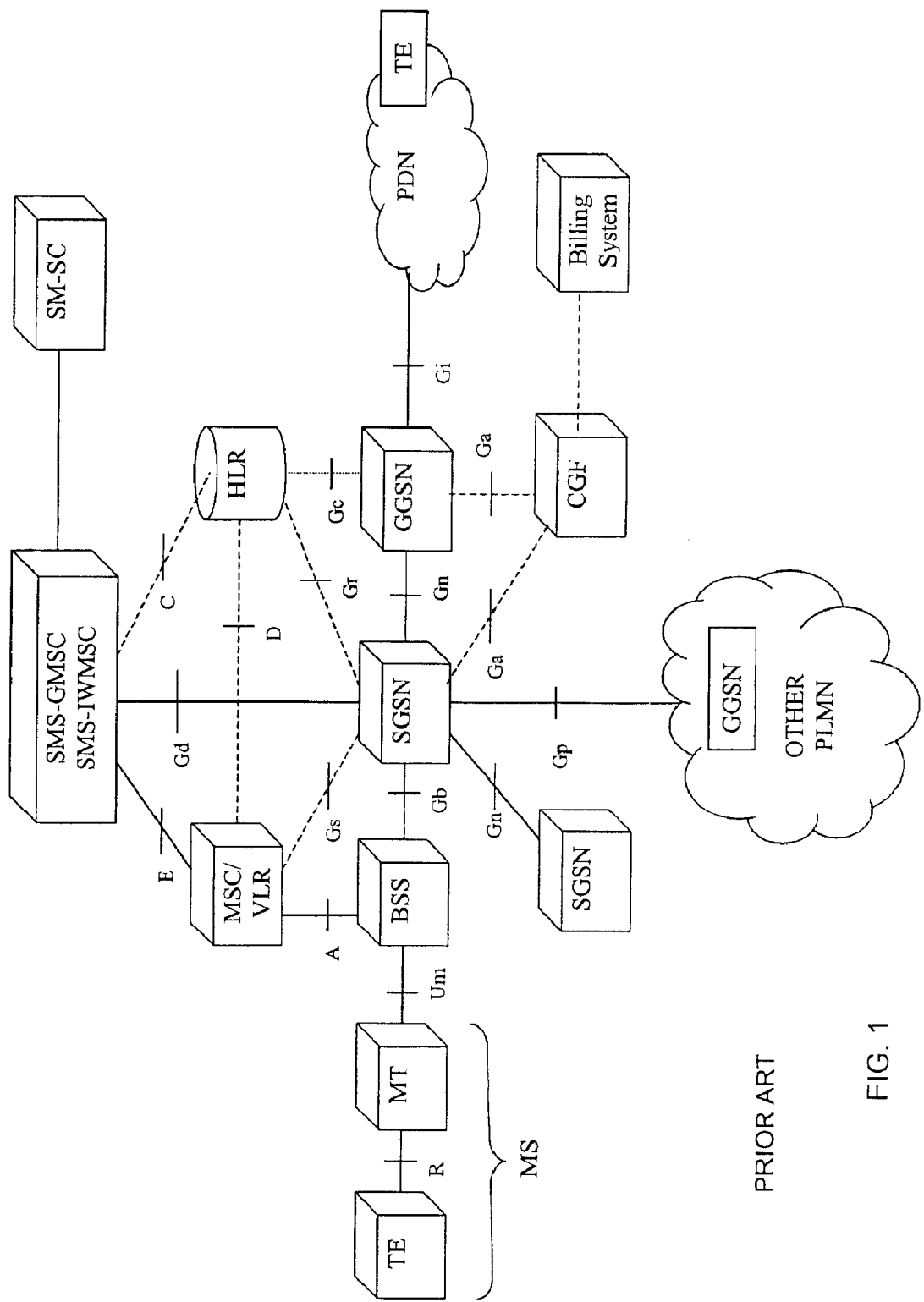
FIG. 1 depicts a combined packet-switched and circuit-switched communication network.
Figure 2:
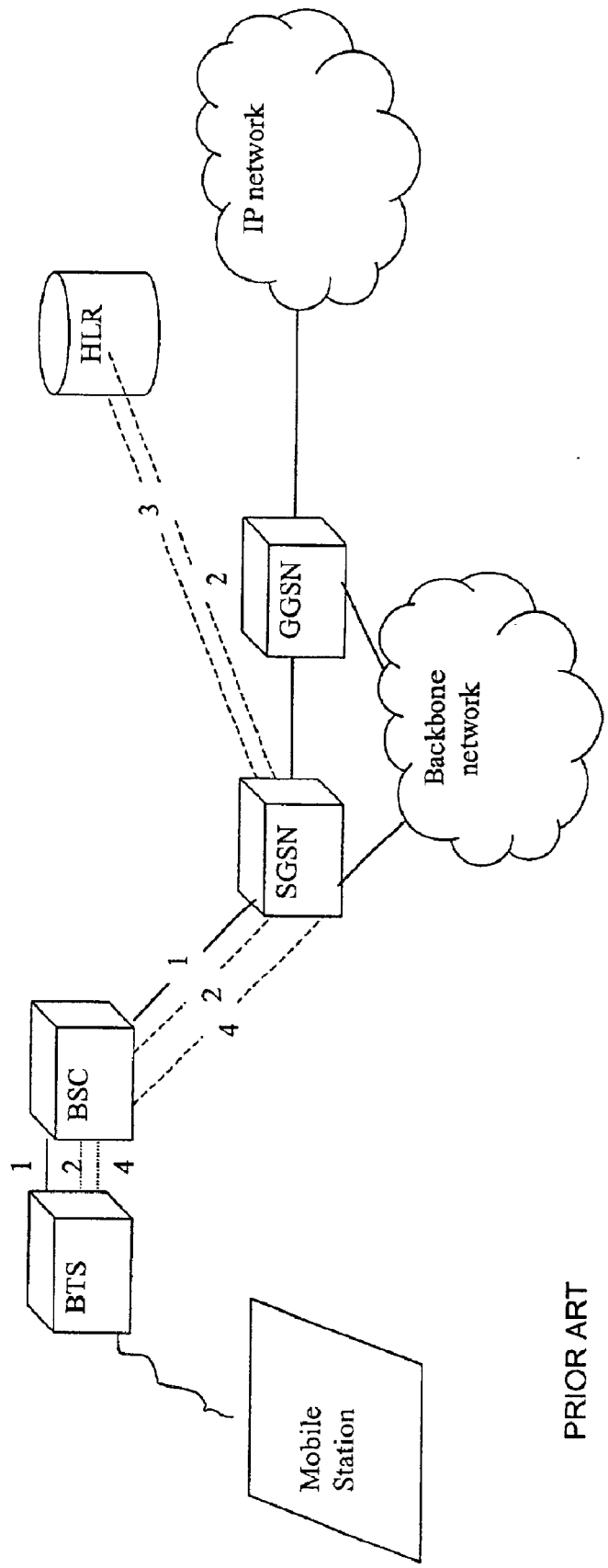
FIG. 2 depicts a simplified GPRS attach in a packet-switched network.
Figure 3:
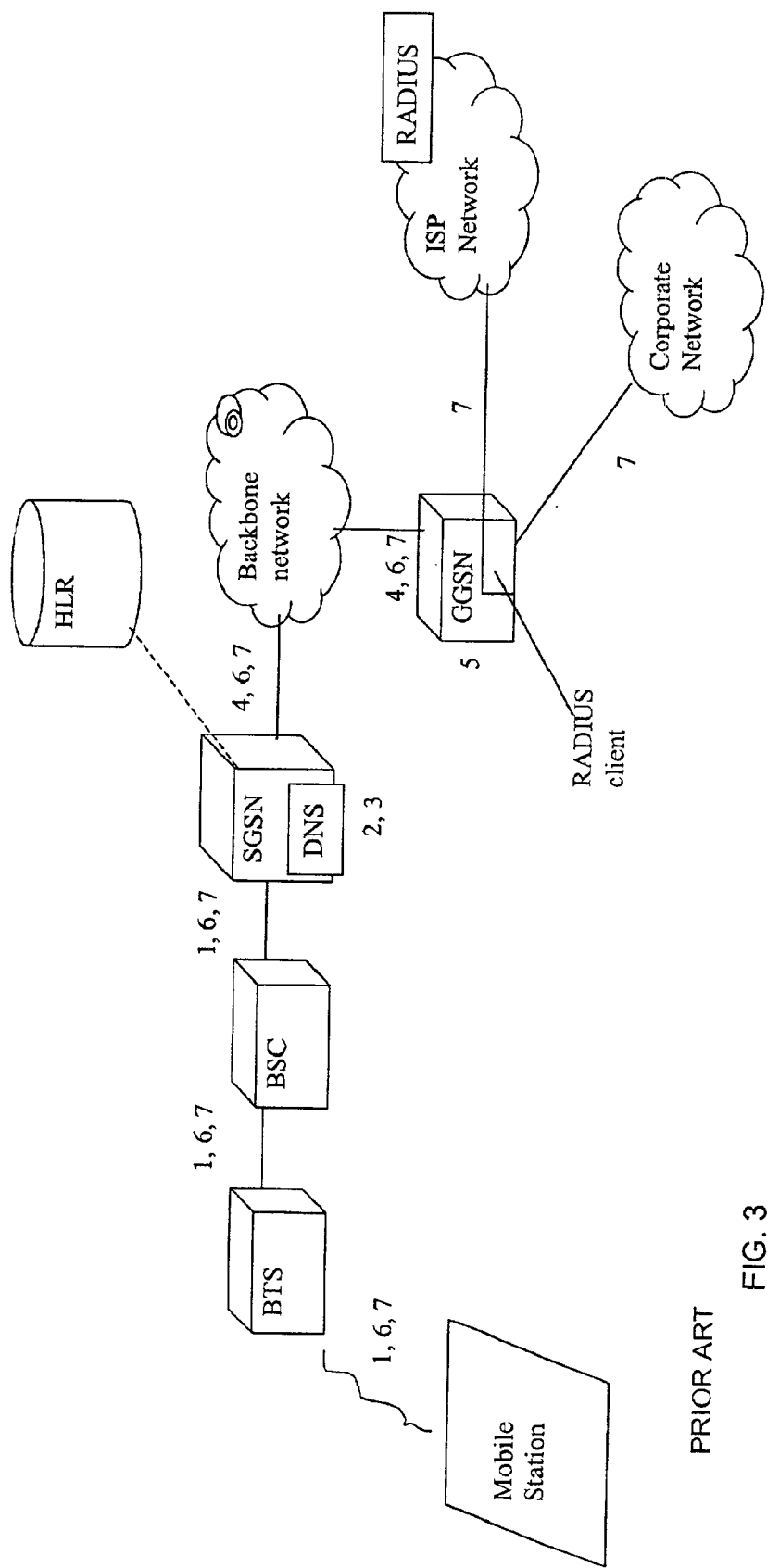
FIG. 3 depicts a simplified PDP context activation in a packet-switched network.
Figure 4:
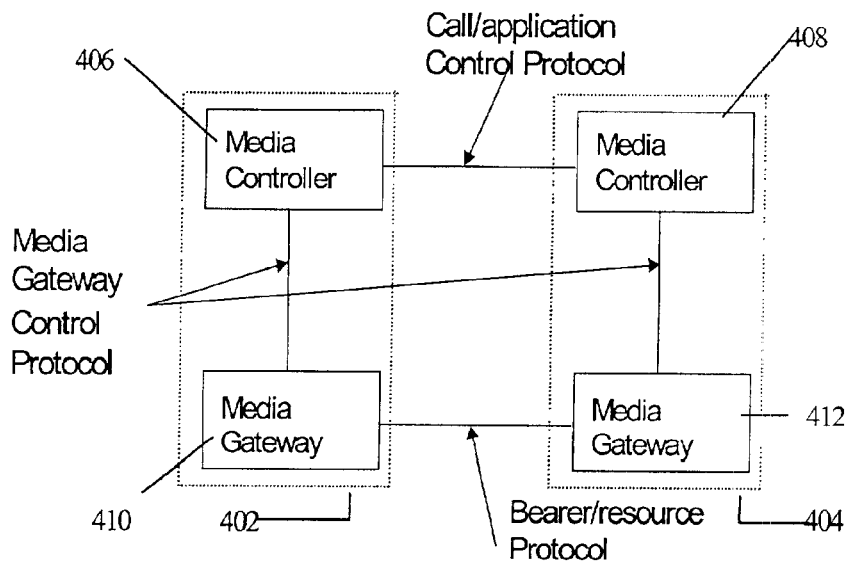
FIG. 4 depicts a network architecture in which nodes are split into control-plane and user-plane entities.

Contexts and Terminations relate to resources in the user plane. A Termination represents a physical or logical endpoint of flows of information, or media, and encapsulates media stream parameters as well as modem and bearer parameters. A Termination may include zero or more Streams and is identified by a TerminationID. Two Terminations are shown in FIG. 5. A Context logically groups one or more Terminations and is identified by a ContextID. A Context describes the topology (who hears/sees whom, i.e., the flow of media among Terminations) and the media mixing and/or switching parameters if more than two Terminations are involved in the Context. One Context that groups two Terminations is shown in FIG. 5. Each user plane entity (i.e., a media gateway in a split architecture like that shown in FIG. 4) can contain, or handle, several Contexts from several MSs. In general, Terminations are added/removed from Contexts by Add and Subtract commands.

Terminations have properties that have unique PropertyIDs, and related properties are grouped into Descriptors, which may be input or output parameters of commands. For example, a Stream describes a flow of media through a Termination in an MG. A Stream may include a received and/or a sent media flow, and is identified by a StreamID. Four bi-directional Streams are depicted in FIG. 5. The Streams 502, 504 are interconnected in the Context and hence they have the same StreamID. Similarly, the Streams 506, 508 are interconnected in the Context and hence they too have the same StreamID. Several Streams can be set up in one Termination, and FIG. 5 shows each Termination having two Streams. User data received by a media gateway is described by a Local Descriptor and user data sent by a media gateway is described by a Remote Descriptor.

The H.248/MEGACO protocol defines an Events Descriptor that describes events to be detected by an MG and what to do when an event is detected. The Events Descriptor typically contains a RequestID and a list of events that the MG is requested to detect and report. The RequestID is used to correlate the request with the notifications that it may trigger. Each event in the Descriptor typically contains an Event name, an optional StreamID, and other optional parameters. When an event is processed against the contents of an active Events Descriptor and found to be present ("recognized") in that Descriptor, the MG typically sends a Notify command to the MC.

For volume-based charging, the Media Controller can send an Event to the Media Gateway, indicating the volume that can be transferred in this session before the Media Gateway must notify the Media Controller. It will be appreciated that the volume condition specified in the Event can be determined in a number of ways, e.g., based on pre-payment for service by a subscriber. It will be appreciated that in connection with a Statistics Descriptor an MG keeps a standard set of statistics for each Termination that may include for example the numbers of octets/packets sent and received.

When the Media Controller is notified by the Media Gateway that the condition(s) specified in the Event is/are fulfilled (e.g., a specified volume has been reached), the Media Controller can take appropriate action. For example, the Media Controller could repeat the whole procedure (setting a new Event or volume threshold for this session), or it could release the session, or it could notify another server/controller of the occurrence of the condition(s) specified in the Event.

Figure 6:
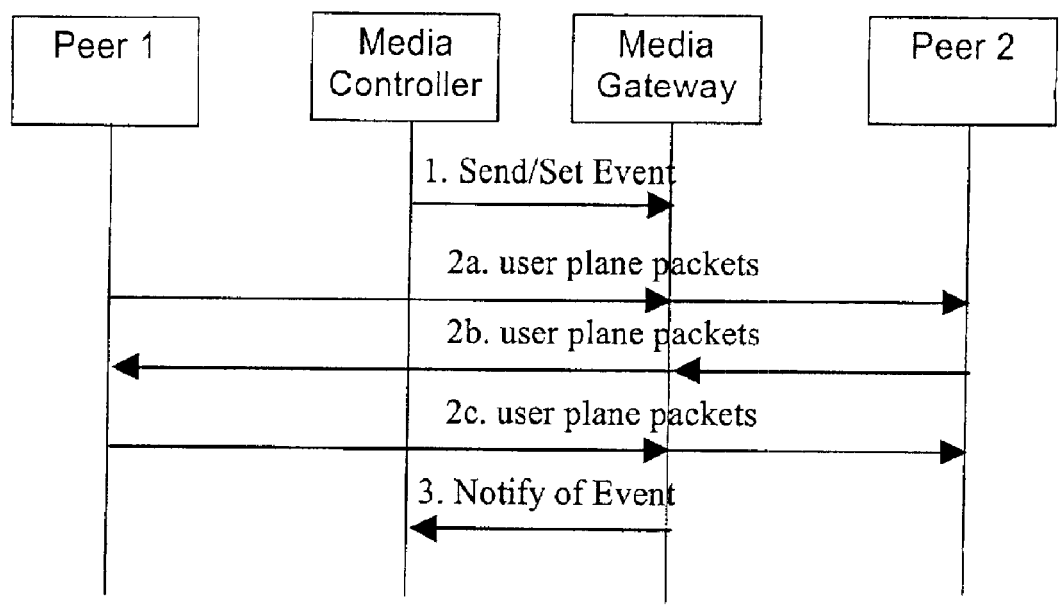
FIG. 6 depicts methods of facilitating charging for communication in accordance with Applicants' invention.

This procedure is depicted in FIG. 6, which for simplicity, assumes that a communication path is already established between peer entities 1, 2 and shows only the signaling required for volume-based or time-based charging. As step 1 of the procedure, the Media Controller sends/sets an Event to order the Media Gateway to report back when a specific volume threshold is encountered. In steps 2a, 2b, 2c, user-plane packets are transferred between the peer entities. In step 3, the Media Gateway discovers that the volume threshold is reached (i.e., the event has occurred), and it therefore notifies the Media Controller of the occurrence. In accordance with the H.248/MEGACO protocol, an MG can notify an MC of the occurrence of an event by sending a Notify command, which may include a TerminationID and an ObservedEvents Descriptor to inform the MC of the event(s) detected. The ObservedEvents Descriptor might include the RequestID of the Events Descriptor that triggered the notification and the event(s) detected, with the parameters associated with the event(s) and the detection time(s).

For time-based charging, the only issue that is currently believed to matter is the time duration of the session or PDP context. The Media Controller can monitor and control the time duration itself, so when time-based charging is applied to a session, the Media Controller can set the lifetime of the session. If the Media Controller discovers that the lifetime of a session has expired, the Media Controller can take appropriate action (e.g., set a new lifetime, release the session, notify another server, etc.). It will be appreciated that this is a way of handling time-based charging when only time-based charging is applied, e.g., for a pre-paid (or Customized Applications for Mobile Network Enhanced Logic (CAMEL)) service.

If volume- and time-based charging are simultaneously applied to a communication session, it currently appears preferable to handle both in the MG as described in more detail below at least because volume and time are usually closely related. Thus, both should be reported when either a volume threshold or a time threshold is reached. It will therefore be understood that Applicants' invention enables charging to be controlled by an MC when only time-based charging is applied to a session and to be controlled by an MG when both volume- and time-based charging are applied to a session.

One of the advantages of using H.248/MEGACO protocol Events in this way is that the Media Controller keeps control of the charging service, even though it is the Media Gateway that has information of how many packets or octets are transferred in the user plane. Also, the signaling between the Media Controller and the Media Gateway is kept low, and interfaces to other functions, e.g., a Service Control Function (SCF), is kept in one node, the Media Controller. Indeed, time-based charging can require minimal signaling between the Media Gateway and the Media Controller.

For volume-based charging, the amount of signaling can be controlled by controlling the size of the volume specified in an Event by the Media Controller. The larger the volume specified, the less often the Media Gateway will report the passage of the specified volume to the Media Controller. This enables a network operator/service provider to adjust the amount of signaling between the Media Gateway and the Media Controller, permitting a trade-off between the smaller volumes desired for accurate charging and the amount of signaling generated.

It will be appreciated that the Media Controller need not be responsible for handling the charging service. Another physically or logically separated node, e.g., an SCF such as a CGF, can be responsible, in which case the Media Controller would report to this other node that the volume or lifetime specified was reached.

It will also be appreciated that this invention can be used even if a protocol other than the H.248/MEGACO protocol and its Events is standardized for GPRS. The invention can be embodied in GPRS/UMTS, GPRS/GSM, and other telecommunication networks in which one of the network nodes, e.g., a GSN, is split into a Media Controller and a Media Gateway. Moreover, the invention as it relates to volume-based charging can be used in the circuit-switched portion of a UMTS or GSM network that already includes time-based charging. For example, the invention as it relates to volume-based charging can be used in a split-architecture MSC in a circuit-switched network employing packet bearers. Although such a split-architecture MSC or the like and network might not be considered a traditional "circuit-switched node" and a traditional "circuit-switched network" to the extent that they handle packet bearers, this terminology will be understood in this application to mean simply nodes that are typical of traditional circuit-switched networks but that have been updated in that they handle packet bearers.

In another aspect of Applicants' invention, CDR functionality is provided by a Media Gateway and a Media Controller with the help of Events defined by a Media Gateway Control protocol such as the H.248/MEGACO protocol. An Event is predefined in an application like GPRS such that the Event informs an MG to watch for fulfillment of a condition if the Event is activated, i.e., sent to the MG from an MC.

It is common to define conditions for which charging data should be recorded and sent for storage and/or post-processing in order not to lose too much charging data in case of an occurrence like a re-start. Examples of such conditions are reaching a volume threshold and reaching a time threshold, which are conditions relevant to both CAMEL and CDR-based charging, and reaching an allowed number of charging condition changes, which is a condition relevant to CDR-based charging. It will be understood that the number of charging condition changes is generally the sum of tariff changes and changes in quality of service (QoS) attributes, or in other words, changes that can result in lower or higher cost for a communication session.

In accordance with an aspect of Applicants' invention, a Media Gateway Control protocol Event is defined to handle these conditions. A Media Controller can then send this Event to the Media Gateway indicating under which conditions the Media Controller should receive the collected charging data. Alternatively, this kind of Event can be pre-provisioned in the Media Gateway, which is to say that it is unnecessary for the Media Controller to send this Event to the Media Gateway.

FIG. 6 again shows the sequence for the case when a volume threshold is reached, and the Media Gateway has been told to report this to the Media Controller. Sequences for other conditions for which the Media Controller should be notified are substantially the same as that depicted in FIG. 6. For example, reaching a time threshold may initiate the reporting instead of the arrival of a user plane octet/packet. If the Media Gateway is not pre-provisioned with the Event, the Media Controller sends/sets the Event (step 1) to indicate for the Media Gateway when to report charging-related data; alternatively, the Event can be pre-provisioned in the Media Gateway. User plane packets are transferred (steps 2a, 2b, 2c) and when the Media Gateway determines that the event has occurred (e.g., the volume threshold is reached), it provides the required data to the Media Controller.

Advantages of this approach are its simplicity and the minimization of the number of parameters that are exchanged by the Media Gateway and the Media Controller as the Media Controller knows most of these. Also, the handling of a CDR is limited to residing in the Media Controller (or alternatively in an external node), and the Media Controller is more suitable for storing such data.

It is currently believed that this invention can be used even if a Media Gateway Control protocol other than the H.248/MEGACO protocol is standardized for GPRS, although using another protocol would probably mean that a term other than Event would be used. Moreover, it is believed that this invention is useful for a packet-switched service such as GPRS in a telecommunication network such as UMTS or GSM having a node of the network split into a Media Controller and a Media Gateway. Furthermore, this invention can be used for handling CDRs in an updated circuit-switched network, e.g., the circuit-switched portions of UMTS and GSM networks, if packet bearers and volume-based charging is provided.

Applicants' invention is described above in connection with various embodiments that are intended to be illustrative, not restrictive. It is expected that those of ordinary skill in this art will modify these embodiments. The scope of Applicants' invention is defined by the following claims, and all modifications that fall within the scopes of these claims are intended to included therein.

What is claimed is:

1. A method of facilitating charging for communication in a telecommunication network having a control-plane entity and a user-plane entity, comprising the steps of:

sending, from the control-plane entity to the user-plane entity, an event in accordance with a media gateway control protocol, wherein the event orders the user-plane entity to notify the control-plane entity when a predetermined volume of communication has occurred;

determining, by the user-plane entity, whether the predetermined volume of communication has occurred; and notifying the control-plane entity when the predetermined volume of communication has occurred;

wherein the user-plane entity notifies the control-plane entity by sending a notify command in accordance with the media gateway control protocol, and the notify command includes a parameter identifying the communication.

2. The method of claim 1, wherein the predetermined volume of communication is a predetermined number of octets.

3. The method of claim 1, wherein the volume of communication is selected such that signaling between the control-plane and user-plane entities is controlled.

4. The method of claim 1, wherein the telecommunication network is a GPRS network that includes a GPRS support node that is spilt into the control-plane and user-plane entities.

5. The method of claim 1, wherein the event orders the user-plane entity to notify the control-plane entity when at least arts of a predetermined volume of communication has occurred and a predetermined time period of communication has elapsed.

6. The method of claim 1, wherein the telecommunication network is a circuit-switched network using packet bearers and having a node that is split into the control-plane and user-plane entities, and the predetermined volume of communication is one of a predetermined number of octets end a predetermined number of packets.

7. The method of claim 6, wherein the event orders the user-plane entity to notify the control-plane entity when at least one of a predetermined volume of communication has occurred and a predetermined time period of communication has elapsed.

8. A method of facilitating charging for communication in a telecommunication network having a control-plane entity and a user-plane entity, comprising the steps of:

pre-provisioning, in the user-plane entity, an event in accordance with a media gateway control protocol, wherein the event orders the user-plane entity to notify the control-plane entity when a predetermined volume of communication has occurred;

determining, by the user-plane entity, whether the predetermined volume of communication has occurred; and notifying the control-plane entity when the predetermined volume of communication has occurred;

wherein the user-plane entity notifies the control-plane entity by sending a notify command in accordance with the media gateway control protocol, and the notify command includes a parameter identifying the communication.

9. The method of claim 8, wherein the predetermined volume of communication is a predetermined number of octets.

10. The method of claim 8, wherein the volume of communication is selected such that signaling between the control-plane and user-plane entities is controlled.

11. The method of claim 8, wherein the telecommunication network is a GPRS network that includes a GPRS support node that is split into the control-plane and user-plane entities.

12. The method of claim 8, wherein the event orders the user-plane entity to notify the control-plane entity when at least one of a predetermined volume of communication has occurred end a predetermined time period of communication has elapsed.

13. The method of claim 8, wherein the telecommunication network is a circuit-switched network using packet bearers and having a node that is spilt into the control-plane and user-plane entities, and the predetermined volume of communication is one of a predetermined number of octets and a predetermined number of packets.

14. The method of claim 13, wherein the event orders the user-plane entity to notify the control-plane entity when at least one of a predetermined volume of communication has occurred and a predetermined time period of communication has elapsed.

* * * * *

UNITED STATES PATENT AND TRADEMARK OFFICE
CERTIFICATE OF CORRECTION

PATENT NO. : 6,879,820 B2
APPLICATION NO. : 09/903365
DATED : April 12, 2005
INVENTOR(S) : Bjelland et al.

It is certified that error appears in the above-identified patent and that said Letters Patent is hereby corrected as shown below:

In Column 1, Line 58, delete "(MSCNLR)" and insert -- (MSC/VLR) --, therefor.

In Column 11, Line 12, in Claim 4, delete "spilt" and insert -- split --, therefor.

In Column 11, Line 16, in Claim 5, delete "arts" and insert -- one --, therefor.

In Column 11, Line 23, in Claim 6, delete "end" and insert -- and --, therefor.

In Column 12, Line 24, in Claim 12, delete "end" and insert -- and --, therefor.

In Column 12, Line 27, in Claim 13, delete "spilt" and insert -- split --, therefor.

Signed and Sealed this

Thirtieth Day of October, 2007

JON W. DUDAS
*Director of the United States Patent and Trademark Office*